No. 787,464. PATENTED APR. 18, 1905.
F. PASCAL.
LIQUID METER.
APPLICATION FILED MAR. 31, 1903.
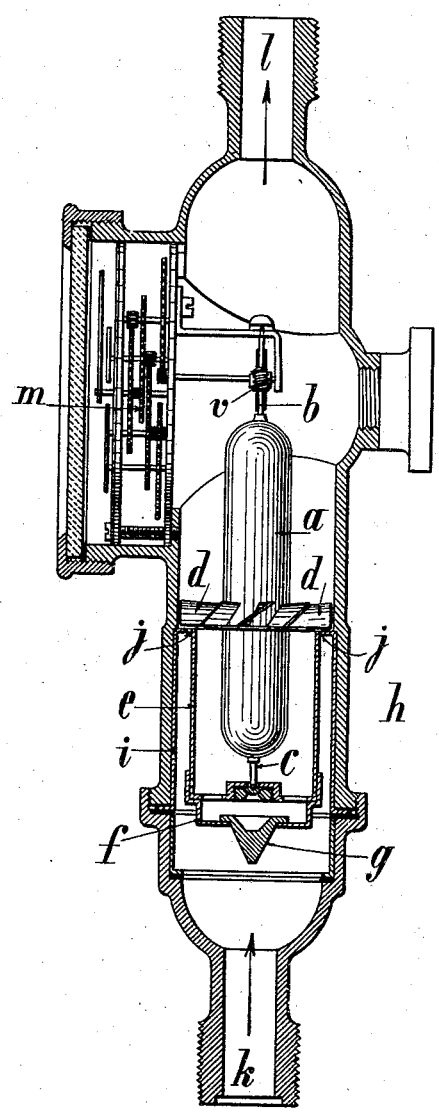
Witnesses:
J. K. Boulter
Inventor:
Francisque Pascal,
By Wm. E. Boulter,
Attorney No. 787,464.

Patented April 18, 1905.

UNITED STATES PATENT OFFICE.

FRANCISQUE PASCAL, OF MONTPLAISIR, FRANCE.

LIQUID-METER.

SPECIFICATION forming part of Letters Patent No. 787,464, dated April 18, 1905.

Application filed March 31, 1903. Serial No. 150,468.

*To all whom it may concern:*

Be it known that I, FRANCISQUE PASCAL, a citizen of the Republic of France, residing at Montplaisir, Lyon, France, have invented certain new and useful Improvements in or Relating to Liquid-Meters, of which the following is a specification.

This invention relates to a water-meter of the kind called "speed-meters" which has the advantage over those hitherto designed of being much more sensitive even with a small quantity of water passing through it. In all meters of this kind the speed of the water is measured by the rotation of a spindle provided in a plane normal to it with a number of inclined blades the theoretical shape of which is a portion of a helical surface, so that the inclination of each of the elements of the surface gives it a tangential speed proportional to its distance from the axis of rotation. The movement of the spindle is transmitted, either by means of an endless screw or by means of a series of toothed wheels, to a counter-gear the hands of which, visible from the outside, indicate the quantity of water consumed. The indications of such an apparatus would be perfect if injurious resistances could be eliminated. The most important of these resistances is due to the friction of the pivots of the movable part in its bearings. The meter according to this invention obviates the drawbacks due to that resistance.

The accompanying drawing shows a meter, in vertical section, provided with a device according to this invention.

In order to nullify the resistance of the movable part on its pivots, the weight of that part is made equal to the volume of water which it displaces. In order to attain this result, the movable part is formed in the example illustrated as a cylinder $a$, with thin walls closed at the ends by spherical or conical caps, through which pass the pivots $b$ and $c$, forming the spindle of the cylinder $a$. Inclined blades $d$, of which there may be any desired number, are arranged round the center of the cylinder $a$ and perpendicular to its axis of rotation, the distribution of the masses being such that the axis of inertia coincides with the axis of rotation of the cylinder $a$. The whole is experimentally balanced in water with great care to insure that its specific gravity be equal to that of water.

The transmission to the clockwork $m$ of the rotary movement imparted to the blades and to the cylinder by the water passing through the meter is effected in the usual way—that is to say, by means of an endless screw $v$, secured to one of the two pivots of the cylinder $a$. Finally, in order to render the meter more sensitive for very small outputs the following arrangement has been adopted: The support $e$ of the lower pivot $c$ forms a cup provided outside with a jacket $i$, so as to leave an annular space communicating close under the ends of the blades $d$ with the upper portion of the meter by means of small holes $j$. The bottom of the cup $e$ is perforated round the pivot $c$ and provided at the bottom with a counter cup $f$, serving as a seat to a valve $g$. The valve $g$ opens in case of a large output, and the water entering under the blades $d$ and round the cylinder $a$ slides along the whole surface of the blades, causing the cylinder to rotate with a speed in proportion to that of water. When the quantity of water becomes small, the valve $g$ closes under the influence of its own weight and the water arrives through the holes $j$, so that it acts only on the ends of the blades, causing the cylinder to turn with a speed in proportion to the quantity of water passing through said holes $j$. For meters with large output the use of two or more of these devices superposed will enable the smallest quantities to be registered in an exact manner whatever be the output.

What I claim as my invention, and desire to secure by Letters Patent, is—

In a liquid-meter, a rotatable cylinder and inclined blades arranged round the center of the cylinder, the latter and blades having the same specific gravity as the liquid to be measured, end pivots for the cylinder, the support for one of the pivots forming a cup, and a jacket arranged to leave an annular space communicating with the upper portion of the meter through openings $j$, the bottom of the said cup being perforated, a counter cup, $f$, and a valve seating in the latter cup and adapted to operate substantially as described.

In testimony whereof I have signed my name to this specification in the presence of two subscribing witnesses.

FRANCISQUE PASCAL.

Witnesses:
    TONY BLIU,
    CLAUDE BERLIE.